(12) United States Patent
Patel et al.

(10) Patent No.: US 10,760,792 B2
(45) Date of Patent: Sep. 1, 2020

(54) COMBUSTOR ASSEMBLY FOR A GAS TURBINE ENGINE

(71) Applicant: General Electric Company, Schenectady, NY (US)

(72) Inventors: Nayan Vinodbhai Patel, Liberty Township, OH (US); James Russo, Evendale, OH (US); Duane Douglas Thomsen, Lebanon, OH (US); Daniel Kirtley, Blue Ash, OH (US)

(73) Assignee: General Electric Company, Schenectady, NY (US)

( * ) Notice: Subject to any disclaimer, the term of this patent is extended or adjusted under 35 U.S.C. 154(b) by 477 days.

(21) Appl. No.: 15/422,759

(22) Filed: Feb. 2, 2017

(65) Prior Publication Data
US 2018/0216825 A1    Aug. 2, 2018

(51) Int. Cl.
| | | |
|---|---|---|
| F23R 3/00 | (2006.01) |
| F23R 3/06 | (2006.01) |
| F23R 3/28 | (2006.01) |
| F23R 3/10 | (2006.01) |
| F23R 3/04 | (2006.01) |
| F23R 3/60 | (2006.01) |

(52) U.S. Cl.
CPC .............. *F23R 3/005* (2013.01); *F23R 3/04* (2013.01); *F23R 3/06* (2013.01); *F23R 3/10* (2013.01); *F23R 3/283* (2013.01); *F23R 3/60* (2013.01); *F23R 2900/00012* (2013.01); *F23R 2900/03041* (2013.01); *F23R 2900/03042* (2013.01)

(58) Field of Classification Search
CPC .... F23R 3/04; F23R 3/60; F23R 3/002; F23R 3/46; F23R 2900/03041; F23R 2900/03042; F23R 3/06; F05D 2240/35; F05D 2260/202
See application file for complete search history.

(56) References Cited

U.S. PATENT DOCUMENTS

| | | |
|---|---|---|
| 4,322,945 A | 4/1982 | Peterson et al. |
| 4,870,818 A | 10/1989 | Suliga |
| 4,934,145 A | 6/1990 | Zeisser |
| 5,255,508 A | 10/1993 | Davis |
| 5,956,955 A * | 9/1999 | Schmid .................. F23R 3/283 60/748 |
| 6,164,074 A | 12/2000 | Madden et al. |
| 6,725,667 B2 | 4/2004 | Farmer et al. |
| 6,976,363 B2 | 12/2005 | McMasters et al. |
| 6,983,599 B2 | 1/2006 | Young et al. |
| 7,260,936 B2 | 8/2007 | Patel et al. |
| 7,451,600 B2 | 11/2008 | Patel et al. |

(Continued)

*Primary Examiner* — Todd E Manahan
*Assistant Examiner* — Thuyhang N Nguyen
(74) *Attorney, Agent, or Firm* — Dority & Manning, P.A.

(57) ABSTRACT

A combustor assembly for a gas turbine engine includes a dome and a deflector positioned adjacent to the dome. One or both of the dome and the deflector define an opening, a component axis extending through the opening, and a radial direction relative to the component axis. The combustor assembly also includes a retainer having an outer member contacting the dome, the deflector or both. The outer member of the retainer defines at least in part a retainer cavity inward of the outer member along the radial direction. The dome, the deflector, or both define a plurality of cooling holes for providing a cooling airflow from the retainer cavity to the opening.

20 Claims, 10 Drawing Sheets

(56) References Cited

U.S. PATENT DOCUMENTS

| | | |
|---|---|---|
| 7,856,826 B2 | 12/2010 | Brown et al. |
| 2014/0102106 A1* | 4/2014 | Snyder ..................... F23R 3/04 60/752 |
| 2017/0009986 A1 | 1/2017 | Patel et al. |

* cited by examiner

COMBUSTOR ASSEMBLY FOR A GAS TURBINE ENGINE

FIELD

The present subject matter relates generally to a gas turbine engine, or more particularly to a combustor assembly for a gas turbine engine.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

The combustion section of the gas turbine engine must withstand extremely high operating temperatures. Due to these high temperatures, a heat shield (e.g., a deflector plate) may be placed around a dome of the combustor assembly. Deflector plates may be fabricated from various materials that are preferably characterized by mechanical and environmental properties that are particularly well suited for its use as a heat shield in the combustor environment of a gas turbine engine.

Even with the advance of high temperature materials, combustor components that are closest in proximity to the combustion flame are still at risk of premature degradation. For example, the inventors of the present disclosure have discovered an area surrounding, or proximate to, the mixers and nozzles of the combustor assembly that are particularly susceptible to damage. Accordingly, a combustor assembly for a gas turbine engine capable of preventing damage to the discovered area surrounding, or proximate to, the mixers and nozzles of the combustor assembly during operation of the gas turbine engine would be useful.

BRIEF DESCRIPTION

Aspects and advantages of the invention will be set forth in part in the following description, or may be obvious from the description, or may be learned through practice of the invention.

In one exemplary embodiment of the present disclosure, a combustor assembly for a gas turbine engine is provided. The combustor assembly includes a dome and a deflector positioned adjacent to the dome. 1 or both of the dome and the deflector define an opening, a component axis extending through the opening, and a radial direction relative to the component axis. The combustor assembly additionally includes a retainer including an outer member contacting the dome, the deflector or both. The outer member of the retainer defines at least in part a retainer cavity inward of the outer member along the radial direction. The dome, the deflector, or both define a plurality of cooling holes for providing a cooling airflow from the retainer cavity to the opening.

In certain exemplary embodiments, the deflector defines the opening, the component axis extending through the opening, and the radial direction relative to the component axis.

With such an exemplary embodiment, the deflector may further define a combustor surface at least partially defining a combustion chamber of the combustor assembly.

Additionally with such an exemplary embodiment the combustor surface of the deflector may define the opening, the plurality of cooling holes may each extend between an inlet and an outlet, and the outlets of each of the plurality of cooling holes may be defined in the combustor surface of the deflector.

Also for such an exemplary embodiment, the dome may include a perimeter flange defining a forward end, the deflector may also include a perimeter flange defining a forward end, and the inlets of each of the plurality of cooling holes may be defined in the forward end of the perimeter flange of the dome, in the forward end of the perimeter flange of the deflector, or in both.

Also for such an exemplary embodiment, the opening defined by the combustor surface of the deflector may be a substantially cylindrical opening.

Also for such an exemplary embodiment, the deflector may include a first bend at an aft end of the opening, the deflector may begin to extend outwardly from the component axis at the first bend, and the outlets of each of the plurality of cooling holes may be defined in the combustor surface of the deflector at a location forward of the first bend.

In certain exemplary embodiments, the plurality of cooling holes are defined in part by the dome and in part the deflector.

In certain exemplary embodiments, the retainer includes one or more attachment members for mounting a mixer of the combustor assembly.

In certain exemplary embodiments, the outer member of the retainer defines a slot configured to provide cooling air to the cavity defined in part by the outer member of the retainer.

In certain exemplary embodiments, the outer member of the retainer defines a plurality of slots configured to provide cooling air to the cavity defined in part by the outer member of the retainer.

In certain exemplary embodiments, the plurality of cooling holes includes at least about fifty cooling holes.

In certain exemplary embodiments, the component axis and radial direction together define a reference plane, and wherein one or more of the plurality of cooling holes intersecting the reference plane defines an angle with the reference plane of at least about twenty degrees.

In certain exemplary embodiments, each of the plurality of cooling holes slope inwardly along the radial direction towards the component axis such that each of the plurality of cooling holes defines an angle with the component axis of at least about ten degrees.

In certain exemplary embodiments, the combustor assembly may also include a fuel nozzle extending at least partially into the opening, wherein the fuel nozzle defines an axis that aligns with the component axis.

In other exemplary embodiments of the present disclosure, a combustor assembly for a gas turbine engine is provided. The combustor assembly includes a dome and a deflector attached to the dome. The deflector defines an opening, a component axis extending through the opening, and a radial direction relative to the component axis. The combustor assembly also includes a retainer having an inner member and an outer member along the radial direction of the deflector, each of the inner member and outer member contacting the dome, the deflector or both. The retainer defines a retainer cavity between the inner member and outer member. The dome, the deflector, or both define a plurality of cooling holes for providing a cooling airflow from the retainer cavity to the opening.

In certain exemplary embodiments the deflector further defines a combustor surface at least partially defining a combustion chamber of the combustor assembly. The combustor surface of the deflector defines the opening, the plurality of cooling holes each extend between an inlet and an outlet, and the outlets of each of the plurality of cooling holes are defined in the combustor surface of the deflector.

For example, with such an exemplary embodiment the dome may include a perimeter flange defining a forward end, the deflector may also include a perimeter flange defining a forward end, and the inlets of each of the plurality of cooling holes may be defined in the forward end of the perimeter flange of the dome, in the forward end of the perimeter flange of the deflector, or in both.

For example, with such an exemplary embodiment the deflector may include a first bend at an aft end of the opening, the deflector may begin to extend outwardly from the component axis at the first bend, and the outlets of each of the plurality of cooling holes may be defined in the combustor surface of the deflector at a location forward of the first bend.

In certain exemplary embodiments, the plurality of cooling holes are defined in part by the dome and in part the deflector.

In yet another exemplary embodiment of the present disclosure, a gas turbine engine defining an axial direction is provided. The gas turbine engine includes a combustion section comprising a combustor assembly. The combustor assembly includes a dome and a deflector positioned adjacent to the dome. One or both of the dome and the deflector define an opening, a component axis extending through the opening, and a radial direction relative to the component axis. The combustor assembly also includes a retainer having an outer member contacting the dome, the deflector or both. The outer member of the retainer defines at least in part a retainer cavity inward of the outer member along the radial direction. The dome, the deflector, or both define a plurality of cooling holes for providing a cooling airflow from the retainer cavity to the opening.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
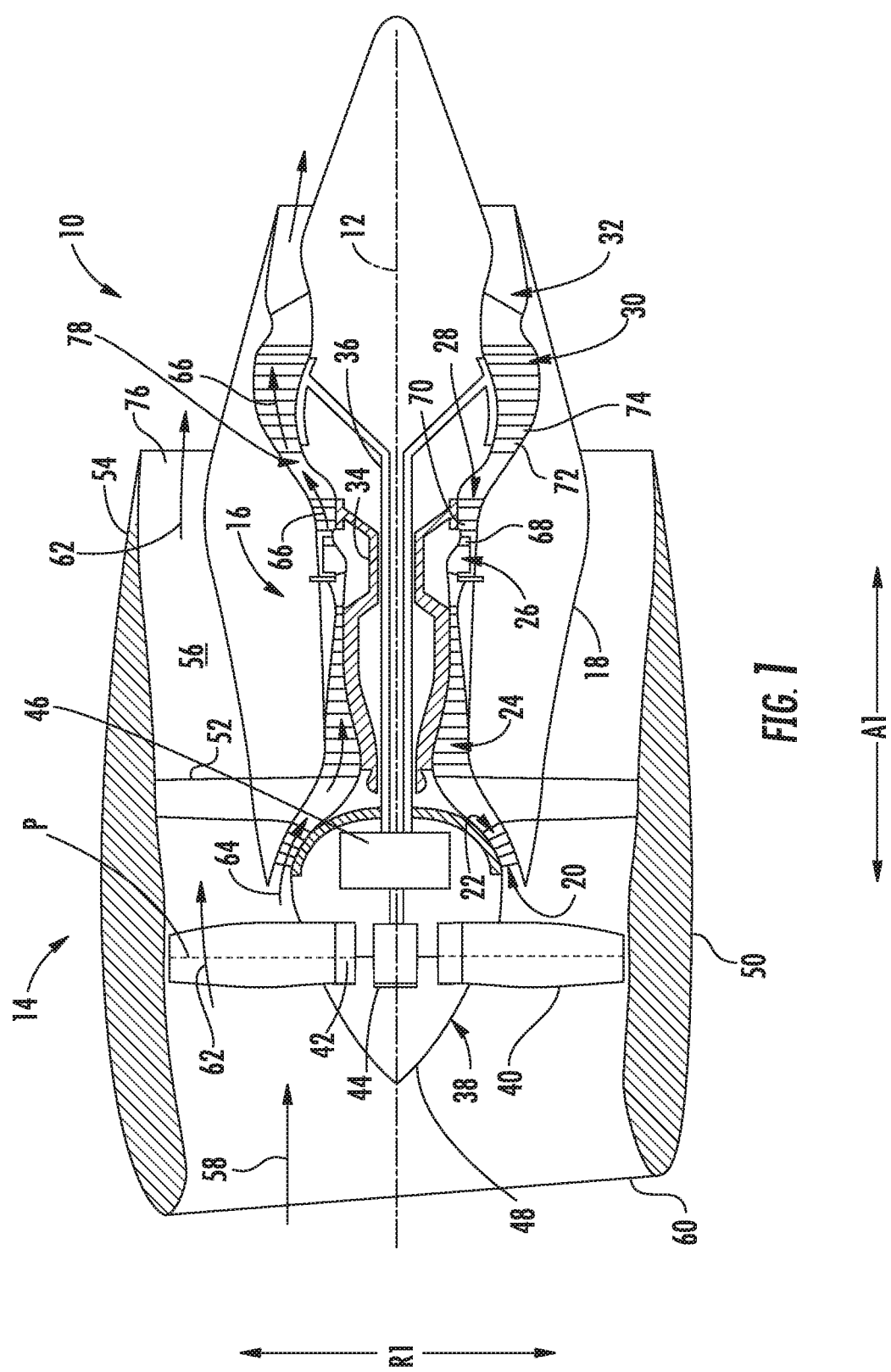
FIG. 1 is a schematic, cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10% margin. Here and throughout the specification and claims, range limitations are combined and interchanged, such ranges are identified and include all the sub-ranges contained therein unless context or language indicates otherwise.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A1 (extending parallel to a longitudinal centerline 12 provided for reference) and a radial direction R1. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R1. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The nacelle 50 is, for the embodiment depicted, supported relative to the core turbine engine 16 by a plurality of circumferentially-spaced outlet guide vanes 52. Additionally, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbofan engine 10 may be a direct drive, turbofan engine (i.e., not including the power gearbox 46), may include a fixed pitch fan 38, etc. Additionally, or alternatively, aspects of the present disclosure may be incorporated into any other suitable gas turbine engine, such as a turboshaft engine, turboprop engine, turbojet engine, a land-based gas turbine engine for power generation, an aeroderivative gas turbine engine, etc.

Figure 2:
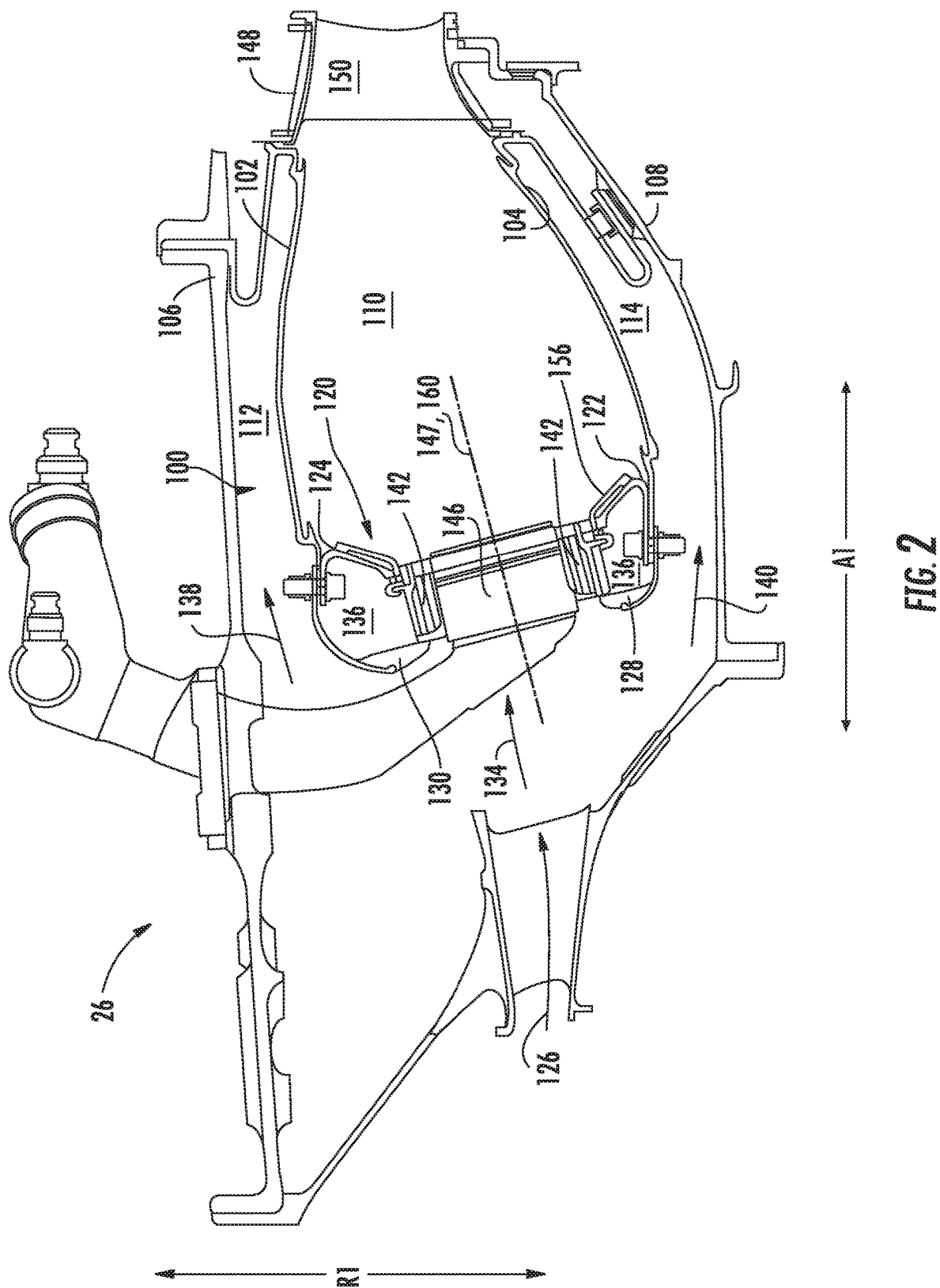
FIG. 2 is a schematic, cross-sectional view of one embodiment of a combustor suitable for use within the gas turbine engine shown in FIG. 1.

Referring now to FIG. 2, a schematic cross-sectional view of one embodiment of a combustor assembly 100 suitable for use within a combustion section of a gas turbine engine (such as the exemplary combustion section 26 of the Turbofan engine 10 of FIG. 1) is illustrated in accordance with aspects of the present subject matter. In the exemplary embodiment depicted, the combustor assembly 100 is configured as a a single annular combustor. However, one skilled in the art will appreciate that the combustor assembly 100 may instead be configured as any other combustor, including, but not limited to, a double annular combustor or a can-annular combustor.

As shown in FIG. 2, combustor assembly 100 includes an outer liner 102 and an inner liner 104 disposed between an outer combustor casing 106 and an inner combustor casing 108. Outer and inner liners 102 and 104 are spaced radially from each other such that a combustion chamber 110 is defined therebetween. Outer liner 102 and outer casing 106 form an outer passage 112 therebetween, and inner liner 104 and inner casing 108 form an inner passage 114 therebetween.

The combustor assembly 100 additionally includes a dome 120 mounted upstream of the combustion chamber 110 that is configured to be coupled to the forward ends of the outer and inner liners 102, 104. More particularly, for the embodiment depicted, the dome 120 is an annular dome formed of an inner annular dome section 122 attached to the forward end of the inner liner 104 and an outer annular dome section 124 attached to the forward end of the outer liner 102.

For the embodiments depicted, the inner liner 104, the outer liner 102, and the other combustor components subjected to high temperatures may be formed of a ceramic matrix composite (CMC) material, which is a non-metallic material having high temperature capability and low ductility. Exemplary CMC materials utilized for such liners 102 and 104 may include silicon carbide, silicon, silica or alumina matrix materials and combinations thereof. Ceramic fibers may be embedded within the matrix, such as oxidation stable reinforcing fibers. By contrast, the dome 120 may be formed of a metal, such as a nickel-based superalloy or cobalt-based superalloy. Additionally, or alternatively, these components may be treated with a thermal barrier coating (TBC) as is known in the art. Thus, the inner and outer liners 102 and 104 may be better able to handle the extreme temperature environment presented in the combustion chamber 110. Although high temperature materials may be used to improve the lifetime of the annular dome and other components, the cooling system described below can extend lifetime even further.

As shown in FIG. 2, the combustor assembly 100 may be configured to receive an annular stream of pressurized compressor discharge air 126 from a discharge outlet of the high pressure compressor 24. To assist in directing the compressed air, the combustor assembly 100 may further include an inner cowl 128 and an outer cowl 130, each of which may be coupled to the forward ends of inner and outer liners 104 and 102, respectively. Compressed fluid may enter combustor assembly 100 between the inner cowl 128 and the outer cowl 130 in a direction generally indicated by arrow 134. The compressed air may enter into a first cavity 136 defined at least in part by the inner and outer cowls 128, 130 and the annular dome 120. As will be discussed in more detail below, a portion of the compressed air in the first cavity 136 may be used for combustion, while another portion may be used for cooling various sections of the combustor assembly 100.

In addition to directing air into first cavity 136 and the combustion chamber 110, the inner and outer cowls 128, 130 may direct a portion of the compressed air around the outside of the combustion chamber 110 to facilitate cooling liners 102 and 104. For example, as shown in FIG. 2, a portion of the compressor discharge air 126 may flow around the combustion chamber 110, as indicated by arrows 138 and 140, to provide cooling air to outer passage 112 and inner passage 114, respectively.

In certain exemplary embodiments, the inner dome section 122 may be formed integrally as a single annular component, and similarly, the outer dome section 124 may also be formed integrally as a single annular component. It should be appreciated, however, that in other exemplary embodiments, the inner dome section 122 and/or the outer dome section 124 may alternatively be formed of one or more components joined in any suitable manner. Additionally, or alternatively, still, the inner dome section 122 and outer dome section 124 may be formed integrally together. For example, the inner dome section 122 and outer dome section 124 may be formed integrally as a single annular component, or alternatively, as a plurality of separate circumferential components. Moreover, although the outer cowl 130 and inner cowl 128 are discussed as being separate components from the outer dome section 124 and inner dome section 122, respectively, in certain exemplary embodiments, one or more of these components may be formed integrally together.

Referring still to FIG. 2, the combustor assembly 100 further includes a plurality of mixers, or rather, mixer assemblies 142, spaced along a circumferential direction of the gas turbine engine (i.e., a direction extending about an axial direction A1; not labeled) between the outer annular dome section 124 and the inner dome section 122. Additionally, the combustor assembly 100 includes a plurality of fuel nozzles 146, each of the plurality of fuel nozzles 146 positioned within a respective mixer assembly 142. Moreover, as is also shown, the combustor assembly 100 further includes a deflector 156 (sometimes also referred to as a heat deflector or heat shield) positioned adjacent to the dome 120 for thermally insulating the dome 120 from the relatively high temperatures generated within the combustion chamber 110 during operation of the gas turbine engine. Notably, the deflector 156 may in certain exemplary embodiments be formed of a CMC material, or another suitably high temperature capable material.

As is depicted, at least one of the deflector 156 or dome 120 defines a plurality of openings 158 within which mixer assemblies 142 and fuel nozzles 146 extend when the combustor assembly 100 is assembled. More particularly, for the embodiment depicted, the deflector 156 defines the plurality of openings 158 spaced along a circumferential direction of the gas turbine engine, with each of the mixer assemblies 142 and fuel nozzles 146 configured to extend into and/or be positioned at least partially within a respective opening 158 of the deflector 156.

Compressed air may be directed from the compressor section into or through one or more of the mixer assemblies 142 to support combustion in the upstream end of the combustion chamber 110. Fuel is transported to the combustor assembly 100 by a fuel distribution system (not shown), where it is introduced through the plurality of fuel nozzles 146. In an exemplary embodiment, each mixer assembly 142 may define a mixer opening for receiving a respective fuel nozzle 146 (details are omitted for clarity). As is depicted, the fuel nozzle 146 extends along an axis 147 and may inject fuel generally along such axis 147. Additionally, or alternatively, the fuel nozzle 146 may inject fuel in any other suitable manner, and in any other suitable direction. For example, the fuel nozzle 146 may inject fuel outwardly from the axis 147, where the fuel may be swirled with the incoming compressed air. For example, fuel and pressurized air may be swirled and mixed together by mixer assemblies 142, and the resulting fuel/air mixture may then be discharged into combustion chamber 110 for combustion thereof.

The combustor assembly 100 may further include an ignition assembly (e.g., one or more igniters extending through the outer liner 102) suitable for igniting the fuel-air mixture. However, details of the fuel injectors and ignition assembly are omitted in FIG. 2 for clarity. Upon ignition, the resulting combustion gases may flow through the combustion chamber 110 into and through the turbine section of the gas turbine engine where a portion of thermal and/or kinetic energy from the combustion gases is extracted via sequential stages of turbine stator vanes and turbine rotor blades. More specifically, the combustion gases may flow into a first stage turbine nozzle 148. As is generally understood, the nozzle 148 may be defined by an annular flow channel that includes a plurality of radially-extending, circularly-spaced nozzle vanes 150 that turn the gases so that they flow angularly and impinge upon the first stage turbine blades (not shown) of an HP turbine 28 (see FIG. 1).

Figure 3:
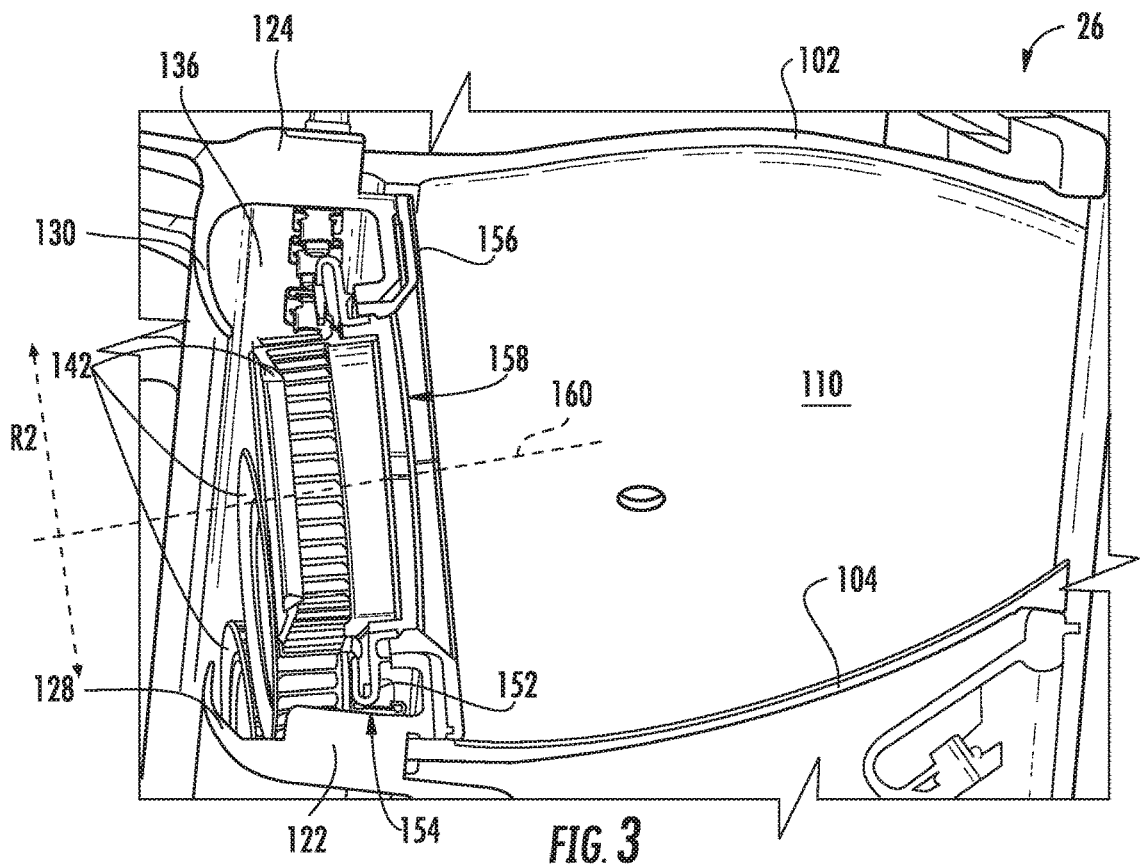
FIG. 3 is a schematic, cross-sectional view of the exemplary combustor assembly of FIG. 2.

Referring now also to FIG. 3, a close-up, cross-sectional view of the combustor assembly 100 described above with reference to FIG. 2 is provided. Notably, the fuel nozzles 146 have been removed for clarity. As is depicted, the exemplary combustor assembly 100 further includes a retainer 152 for mounting a mixer, i.e., mixer assembly 142, within the combustor assembly 100. More specifically, as will be described in greater detail below, the retainer 152 includes one or more attachment members 154 for mounting the mixer assembly 142 within the combustor assembly 100. For the embodiment depicted, the attachment members 154 are configured as clips for receiving a portion of the respective mixer assembly 142. However, in other exemplary embodiments, the attachment members 154 may be configured in any other suitable manner.

Moreover, as briefly mentioned above, for the embodiment depicted, the deflector 156 defines a plurality of openings within which the mixer assemblies 142 and fuel nozzles 146 extend. Referring particularly to the opening 158 defined by the deflector 156 depicted in FIG. 2, the deflector 156 further defines a component axis 160 extending through the opening 158, as well as a radial direction R2 and a circumferential direction C2 (see, e.g., FIG. 6), each relative to the component axis 160. For the embodiment depicted, the opening 158 defined by the deflector 156 is a substantially cylindrical opening with the component axis extending along a center thereof. As will be appreciated, and referring back briefly to FIG. 2, when the fuel nozzle 146 is installed within the combustor assembly 100, the fuel nozzle 146 extends at least partially into the opening 158 defined by the deflector 156. Further, when installed, the fuel nozzle 146 extends along the component axis 160 defined by the deflector 156, and more specifically, the component axis 160 defined by the deflector 156 is aligned with the axis 147 of the fuel nozzle 146 when the fuel nozzle 146 is installed.

Figure 4:
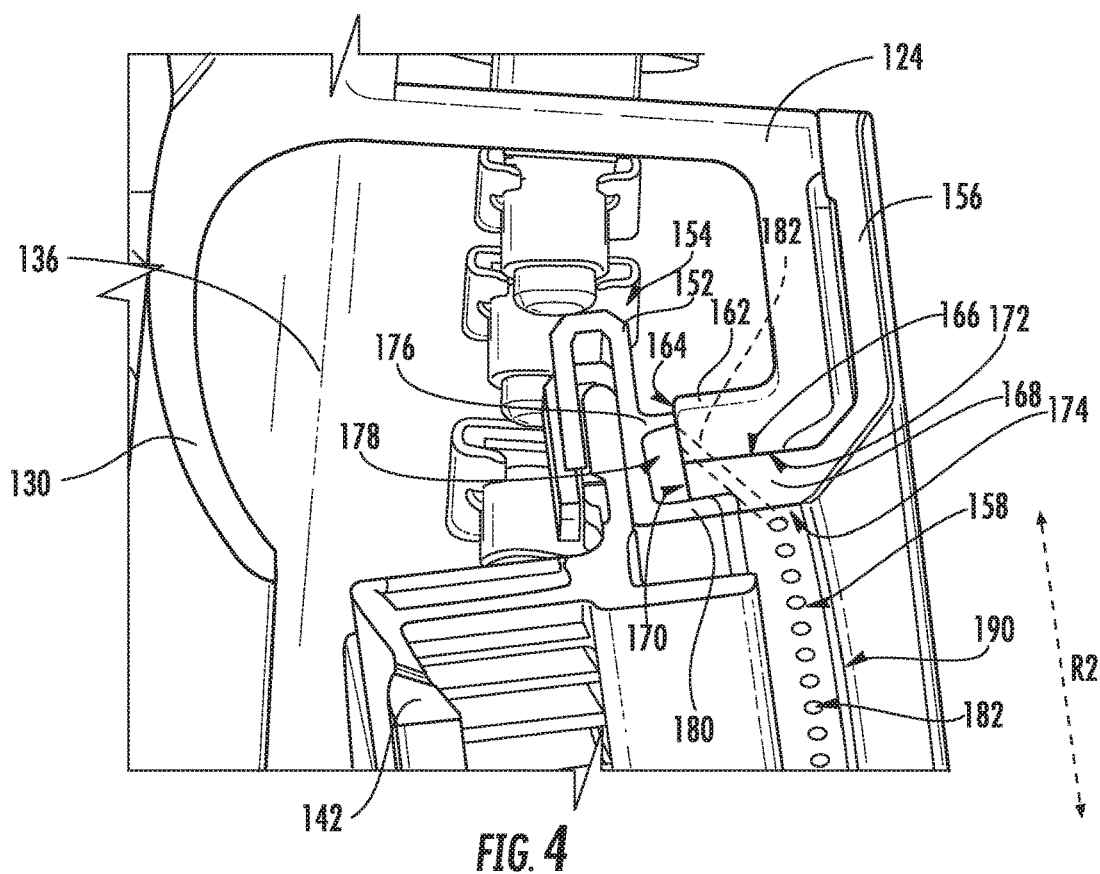
FIG. 4 is a close-up, cross-sectional view of a dome and a deflector in the exemplary combustor assembly of FIG. 2.

Referring now to FIG. 4, another close-up view is provided of a section of the exemplary combustor assembly 100 described above. As is depicted, the dome 120 includes a perimeter flange 162 extending around the opening 158 defined by the deflector 156. The perimeter flange 162 of the dome 120 defines a forward end 164 and an inner surface 166 along the radial direction R2 defined by the deflector 156 (i.e., a surface closest to the opening 158 defined by the deflector 156). Additionally, the deflector 156 includes a perimeter flange 168 extending around the opening 158, the perimeter flange 168 defining a forward end 170 and an outer surface 172 along the radial direction R2 defined by the deflector 156. The deflector 156 further defines a combustor surface 174, which for the embodiment depicted is an inner surface of the perimeter flange 168 of the deflector 156 along the radial direction R2. The combustor surface 174 at least partially defines the combustion chamber 110 of the combustor assembly 100.

Moreover, for the embodiment depicted, the perimeter flange 168 of the deflector 156 is attached to the perimeter flange 162 of the dome 120. More specifically, the inner surface of the perimeter flange 162 of the dome 120 is coupled to the outer surface of the perimeter flange 168 of the deflector 156, e.g., by brazing, welding, or some other suitable attachment means.

FIG. 4 further depicts with additional clarity the retainer 152. As is depicted, the retainer 152 includes an outer member 176 along the radial direction R2 contacting the dome 120, the deflector 156, or both. The outer member 176 of the retainer 152 defines at least in part a retainer cavity 178 inward of the outer member 176 along the radial direction R2. Furthermore, for the embodiment depicted, the retainer 152 further includes an inner member 180 along the radial direction R2 also contacting the dome 120, the deflector 156, or both. The inner member 180 of the retainer 152 also at least in part defines the retainer cavity 178.

Further, for the embodiment depicted, the retainer 152 is attached to the deflector 156 through the inner member 180 of the retainer 152. More specifically, the inner member 180 extends past the forward end 170 of the perimeter flange 168 of the deflector 156 and is coupled to the inner surface, or combustor surface 174, of the deflector 156. The inner member 180 may be attached to the combustor surface 174 by brazing, welding, or any other suitable means.

The inventors of the present disclosure have discovered that the a portion of combustor surface 174 of the deflector 156 defining the opening 158 (i.e., for the embodiment depicted, a portion of a hot side surface of the deflector 156 extending along the component axis 160, at a radially inner section of the deflector 156) may be particularly susceptible to the relatively high temperatures within the combustion chamber 110 during operation of the gas turbine engine. Accordingly, for the combustor assembly 100 of the present disclosure, the dome 120, the deflector 156, or both define a plurality of cooling holes 182 for providing a cooling airflow from the retainer cavity 178 (i.e., the cavity defined in part by the outer member 176 of the retainer 152, and for the embodiment depicted, in part by the inner member 180 of the retainer 152) to the opening 158 defined by the deflector 156.

Figure 5:
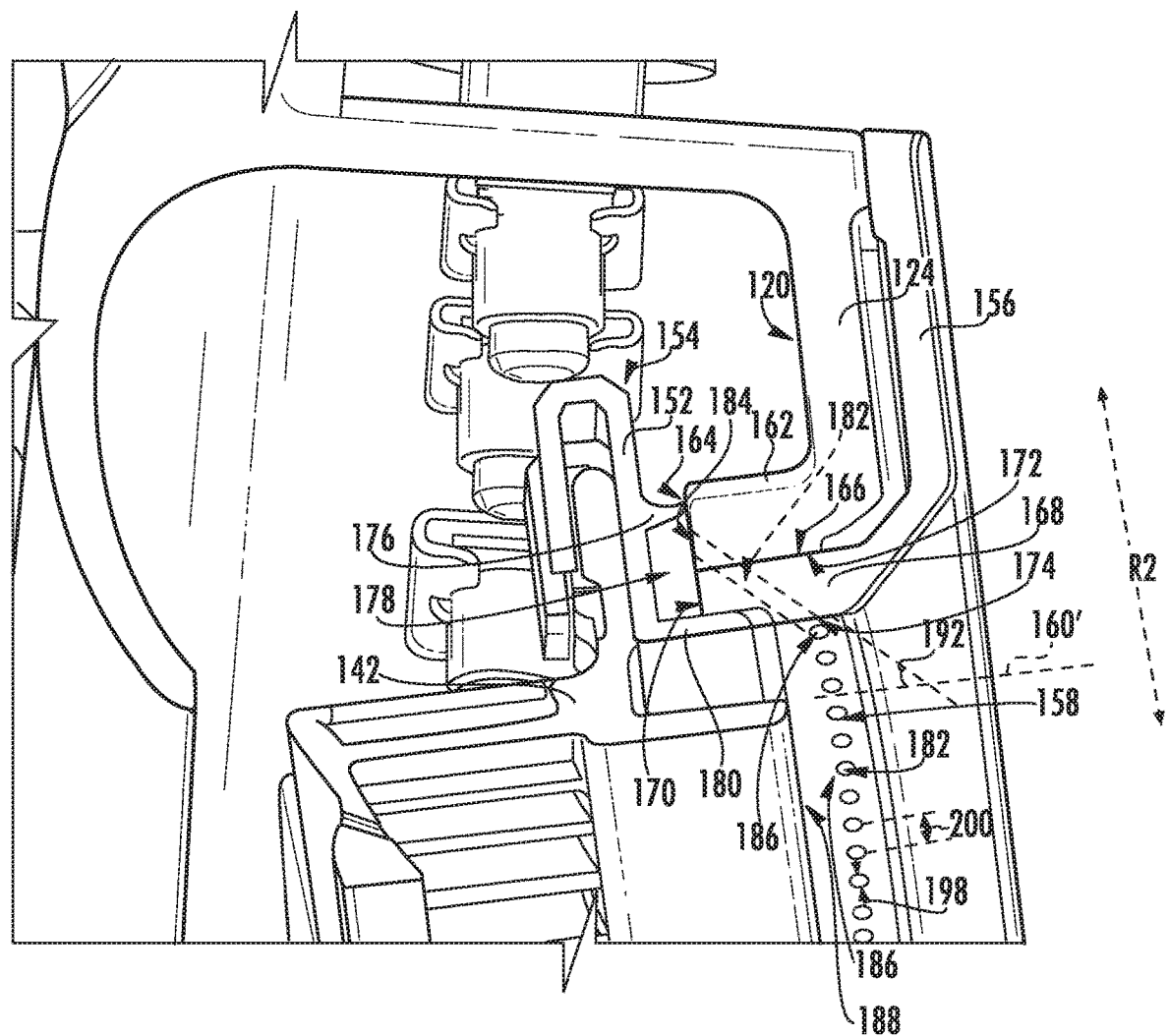
FIG. 5 is another close-up, cross-sectional view of the dome and the deflector in the exemplary combustor assembly of FIG. 2.

Referring still to FIG. 4, and now also to FIG. 5, an enlarged view of the dome 120, deflector 156, and retainer 152 of the exemplary combustor assembly 100 of the present disclosure is provided. Notably, FIG. 5 includes one exemplary cooling hole 182 of the plurality of cooling holes 182 depicted in phantom for illustrative purposes. As is shown, each of the plurality of cooling holes 182 extends between an inlet 184 and an outlet 186. For the embodiment depicted, the inlets 184 of each of the plurality of cooling holes 182 are defined in the forward end 164 of the dome 120 (or rather, of the perimeter flange 162 of the dome 120), in the forward end 170 of the deflector 156 (or rather of the perimeter flange 168 of the deflector 156), or both. More specifically, for the embodiment depicted, the inlets 184 of each of the plurality of cooling holes 182 are defined in the forward end 164 of the perimeter flange 162 of the dome 120.

Additionally, for the embodiment depicted, the outlets 186 of each of the plurality of cooling holes 182 are defined in the combustor surface 174 of the deflector 156. Moreover, for the embodiment depicted, the plurality of outlets 186 are located aft of an aft 188 end of the mixer assembly 142 positioned within the opening 158. For example, in the embodiment depicted the aft end 188 of the mixer assembly 142 defines a mixer reference plane (not labeled), and the outlets 186 of the plurality of cooling holes 182 are each positioned aft of the mixer reference plane. Moreover, for the embodiment depicted, the outlets 186 of the plurality of cooling holes 182 are further located forward of a first bend 190 of the deflector 156, and more specifically approximately halfway between the first bend 190 of the deflector 156 and a location at which the mixer reference plane intersects the deflector 156. The first bend 190 of the deflector 156 refers to a portion of the deflector 156 at an aft end of the opening 158, where the substantially cylindrical opening 158 ends and the deflector 156 begins to flare/extend outwardly from the component axis 160.

Accordingly, for the embodiment depicted, the plurality of cooling holes 182 are defined in part by the dome 120 and in part by the deflector 156. More specifically, for the embodiment depicted, each of the plurality of cooling holes 182 extends partially through the perimeter flange 162 of the dome 120 and partially through the perimeter flange 168 of the deflector 156. In certain exemplary embodiments, the plurality of cooling holes 182 may be formed using a drilling process subsequent to the attachment of the dome 120 and deflector 156.

Notably, in order to extend in the manner described herein, each of the plurality of cooling holes 182 are sloped inwardly towards the component axis 160 of the deflector 156. Accordingly, each of the plurality of cooling holes 182 defines an angle 192 with the component axis 160. For the embodiment depicted, the angle 192 of each of the plurality of cooling holes 182 with the component axis 160 is at least about ten degrees. For example in certain exemplary embodiments, the angle 192 of each of the plurality of cooling holes 182 with the component axis 160 may be at least about fifteen degrees, such as at least about twenty degrees.

Figure 6:
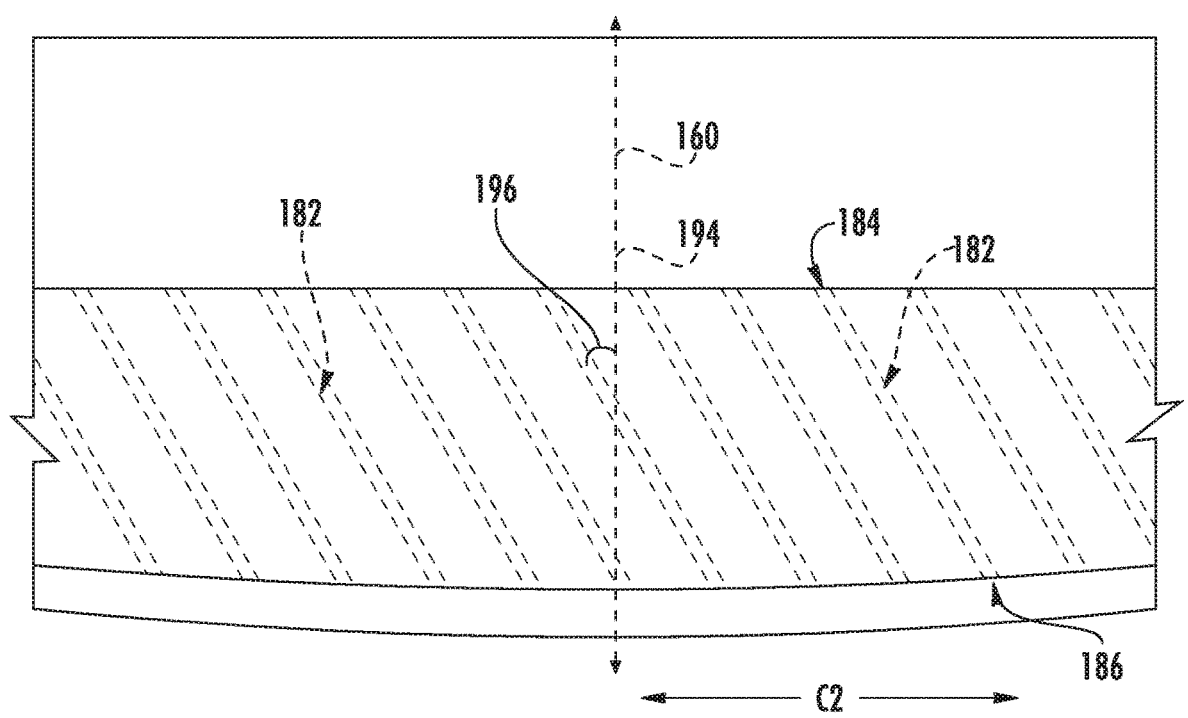
FIG. 6 is top view of a perimeter lip of the dome of the exemplary combustor assembly of FIG. 2.

Additionally, referring briefly to FIG. 6, providing a top view of the perimeter flange 162 of the dome 120, with the plurality of cooling holes 182 depicted in phantom, it will be appreciated that for the embodiment depicted, the plurality of cooling holes 182 are also swirled about the component axis 160. More specifically, the component axis 160 and the radial direction R2 of the deflector 156 together define a reference plane 194 (the reference plane 194 may be the view depicted in, e.g., FIG. 5). For the embodiment depicted, one or more of the plurality of cooling holes 182 intersecting the reference plane 194 defines an angle 196 with reference plane 194. More specifically, for the embodiment depicted, the angle 196 of the one or more cooling holes 182 intersecting the reference plane 194 is at least about twenty degrees. For example, in certain exemplary embodiments, the angle 196 may be at least about twenty-five degrees, such as at least about thirty degrees, such as at least about thirty-five degrees.

It should be appreciated, however, that in other exemplary embodiments, the plurality of cooling holes 182 may not be swirled about the component axis 160. For example, in other exemplary embodiments, an angle 196 of a cooling hole 182 of the plurality of cooling holes 182 intersecting the reference plane 194 may be substantially zero degrees. Accordingly, the cooling hole 182 may, in such an embodiment, extend along the reference plane 194.

Referring back to FIG. 5, for the embodiment depicted, each of the plurality of cooling holes 182 is substantially cylindrical in shape, extending in a substantially straight line and defining a diameter 198. The diameter 198 of each of the plurality of cooling holes 182 is, for the embodiment depicted, less than about 0.1 inches. For example, the diameter 198 of each of the plurality of cooling holes 182 may be less than about 0.075 inches, such as less than about 0.05 inches, such as less than about 0.03 inches. Additionally, the diameter 198 may be greater than 0.005 inches. Notably, however, in other exemplary embodiments, the plurality of cooling holes 182 may define a non-cylindrical shape (i.e., a non-circular cross-sectional shape). For example, in other exemplary embodiments, the plurality of cooling holes 182 may define an ovular cross-sectional shape, a polygonal cross-sectional shape, or any other suitable shape. Further, in certain exemplary embodiments, the cooling holes 182 may not extend in a straight direction, and instead may be curved or have some other shape.

Additionally, referring still to FIG. 5, the plurality of cooling holes 182 are substantially evenly spaced along a circumference of the opening 158 defined by the deflector 156 (i.e., in the circumferential direction C2). More specifically, a separation distance 200 from a center of an outlet 186 of one cooling hole 182 to a center of an outlet 186 of an adjacent cooling hole 182 is substantially constant along the circumference of the opening 158. In certain exemplary embodiments, the separation distance 200 from the center of an outlet 186 of one cooling hole 182 to the center of an outlet 186 of an adjacent cooling hole 182 may be less than about four times the diameter 198 of each of the plurality of cooling holes 182. For example, in certain exemplary embodiments the separation distance 200 from the center of an outlet 186 of one cooling hole 182 to the center of an outlet 186 of an adjacent cooling hole 182 may be less than about three times the diameter 198 of each of the plurality of cooling holes 182.

Moreover, the combustor assembly 100 may include a relatively high number of cooling holes 182. For example, the plurality of cooling holes 182 spaced along the circumference of the opening 158 may include at least about fifty cooling holes 182, such as at least about sixty cooling holes 182, such as at least about seventy cooling holes 182. Additionally, the plurality of cooling holes 182 may include less than about five hundred cooling holes 182.

A combustor assembly including a plurality of cooling holes as described herein may prevent damage to the combustor surface of the heat deflector during operation of the gas turbine engine. More specifically, including a plurality of cooling holes of the size, number, and/or orientation described herein may effectively form a "curtain" of cooling air over the combustor surface of the deflector during operation of the gas turbine engine to prevent or minimize an amount of damage to such combustor surface of the deflector during operation of the gas turbine engine.

It should be appreciated, however, that in other exemplary embodiments, the combustor assembly 100 may be configured in any other suitable manner, and may include cooling holes 182 in accordance with any other suitable embodiment of the present disclosure. For example, in other exemplary embodiments, the perimeter flange 168 of the deflector 156 may extend to the retainer 152, and be attached to the retainer 152 without necessitating the inner member 180 of the retainer 152.

Figure 7:
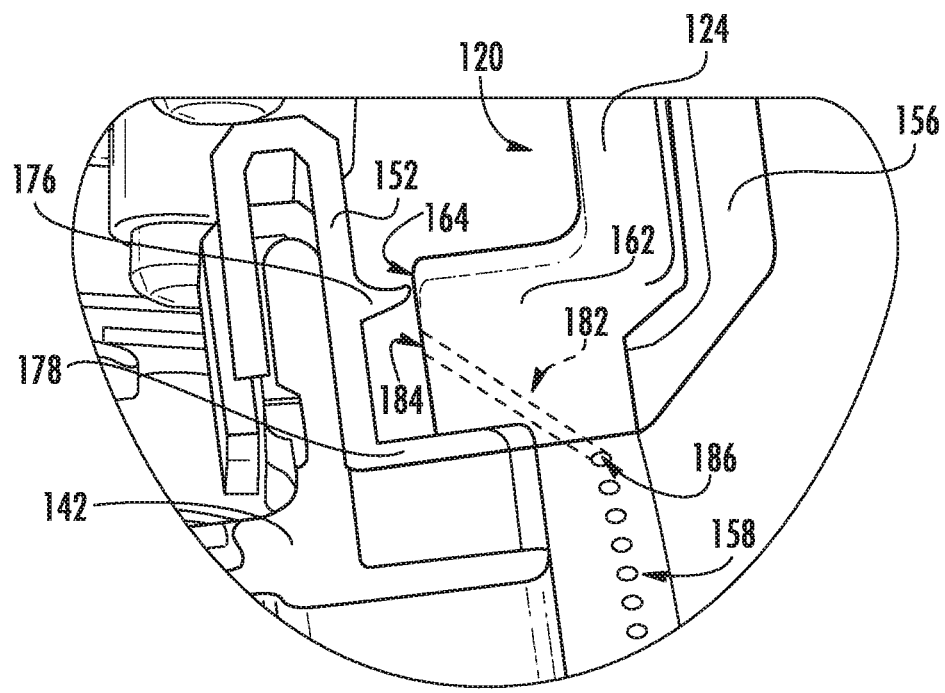
FIG. 7 is a close-up, cross-sectional view of a dome and a deflector of a combustor assembly in accordance with another exemplary embodiment of the present disclosure.
Figure 8:
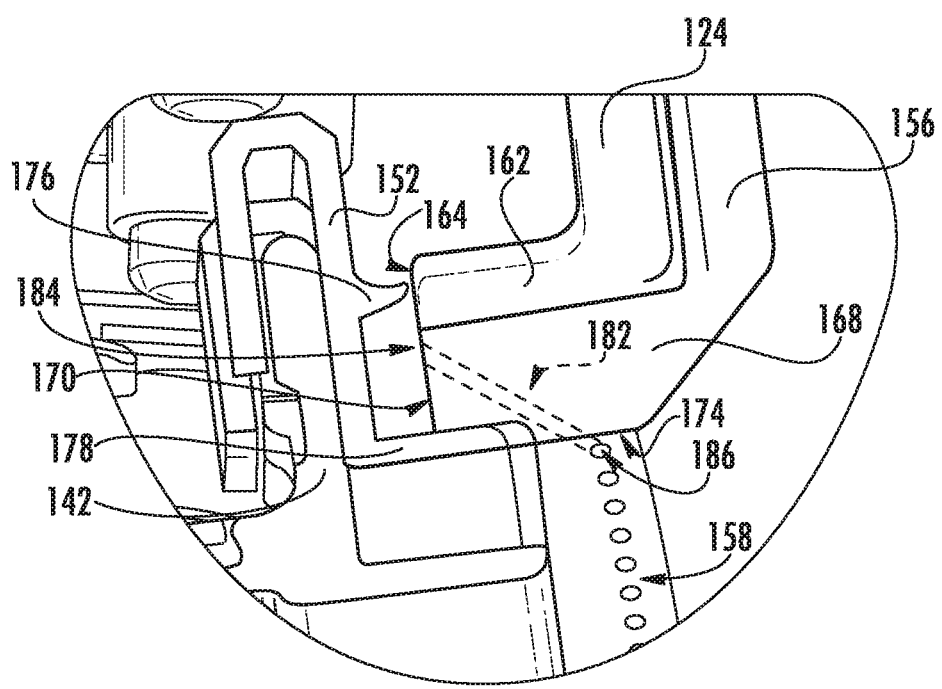
FIG. 8 is a close-up, cross-sectional view of a dome and a deflector of a combustor assembly in accordance with still another exemplary embodiment of the present disclosure.

Additionally, referring now briefly to FIGS. 7 and 8, providing close-up views of a deflector 156, a dome 120, and a retainer 152 in accordance with exemplary embodiments of the present disclosure, it should be appreciated that in still other embodiments, the plurality of cooling holes 182 may be defined solely in the dome 120 or solely in the deflector 156. For example, referring to FIG. 7, the dome 120 and the deflector 156 are configured such that the plurality of cooling holes 182 are defined solely by the dome 120. With such an embodiment, the dome 120 may further define the opening 158 through which the mixer assembly 142 and fuel nozzle 146 extend. The dome 120 may further still define the component axis 160, the radial direction R2 relative to the component axis 160, and the circumferential direction (not labeled) relative to the component axis 160. Additionally, with such an embodiment, the inlets 184 of the plurality of cooling holes 182 are defined in a forward end 164 of the dome 120, and the outlets 186 of the plurality of cooling holes 182 are defined in an inner surface 166 of the dome 120. By contrast, referring to FIG. 8, the dome 120 and the deflector 156 are configured such that the plurality of cooling holes 182 are defined solely by the deflector 156. More particularly, for such an embodiment, the inlets 184 of the plurality of cooling holes 182 are defined in a forward end 170 of the deflector 156, and the outlets 186 of the plurality of cooling holes 182 are defined in an inner surface of the deflector 156 (i.e., a combustor surface 174).

Additionally, in still other exemplary embodiments, the plurality of cooling holes 182 may have any other suitable configuration. For example, referring now to FIG. 9, a close-up view of a deflector 156, a dome 120, and a retainer 152 in accordance with another exemplary embodiment of the present disclosure is provided. The exemplary deflector 156, dome 120, and retainer 152 of FIG. 9 may be configured in substantially the same manner as the exemplary deflector 156, dome 120, and retainer 152 described above with reference to, e.g., FIG. 5. However, for the exemplary embodiment of FIG. 9, instead of including a single row of cooling holes 182 defined by and extending through one or both of a perimeter flange 162 of the dome 120 and a perimeter flange 168 of the deflector 156, the exemplary combustor assembly 100 includes multiple rows of cooling holes 182 defined by and extending through one or both of the perimeter flange 162 of the dome 120 and the perimeter flange 168 of the deflector 156.

Figure 9:
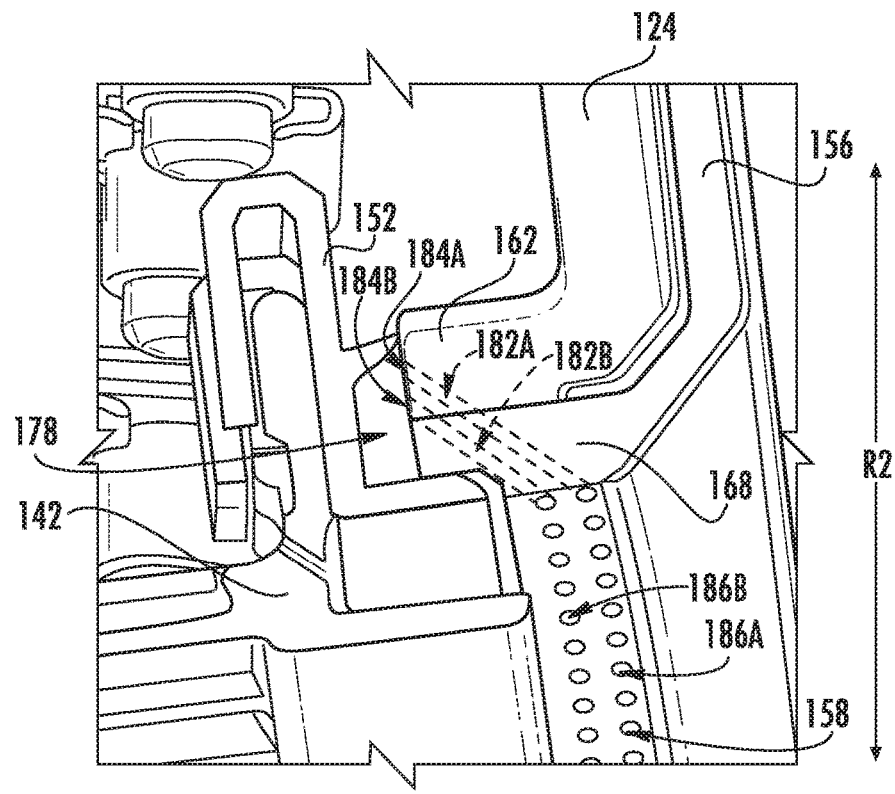
FIG. 9 is a close-up, cross-sectional view of a dome and a deflector of a combustor assembly in accordance with yet another exemplary embodiment of the present disclosure.

More specifically, for the embodiment of FIG. 9, the combustor assembly 100 includes a first, forward row of cooling holes 182A and a second, aft row of cooling holes 182B spaced along the component axis 160. Each of the first and second rows of cooling holes 182A, 182B extend between their respective inlets 184A, 184B and outlets 186A, 186B. As with the embodiment above, the outlets 186A, 186B of the first and second rows of cooling holes 182A, 182B are each positioned aft of an aft end 188 of a respective mixer assembly 142 extending into the opening 158 defined by the deflector 156 (i.e., aft of a plane defined by the aft end 188 of the mixer assembly 142 extending into the opening 158 defined by the deflector 156).

Figure 10:
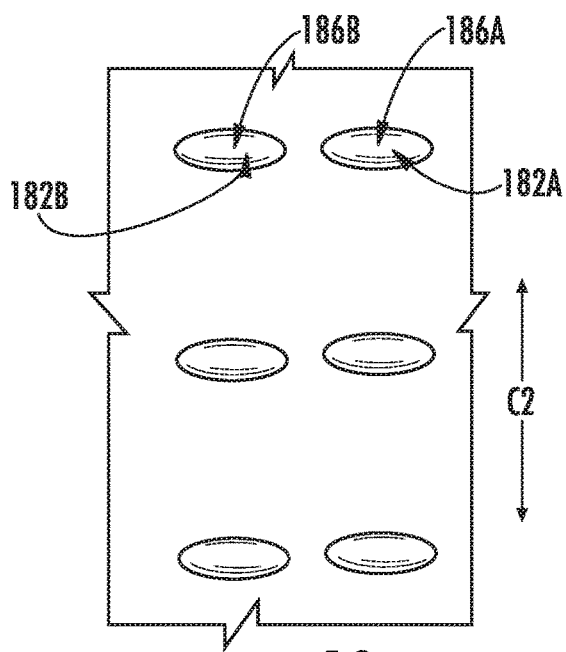
FIG. 10 is a plan view of an inside surface of the deflector of FIG. 8.

Additionally, for the embodiment depicted, the plurality of outlets 186A of the first row of cooling holes 182A are aligned with the plurality of outlets 186B of the second row of cooling holes 182B along the circumferential direction C2. For example, referring briefly to FIG. 10, providing a plan view of a portion of the combustor surface 174 of the deflector 156 defining the opening 158, the plurality of outlets 186A of the first row of cooling holes 182A are aligned with the plurality of outlets 186B of the second row cooling holes 182B along the circumferential direction C2. Notably, although the plurality of outlets 186A, 186B of the first and second rows of cooling holes 182A, 182B appear to be ovular, such is due to the angle 192 at which the respective cooling holes 182 extend relative to the component axis 160.

Figure 11:
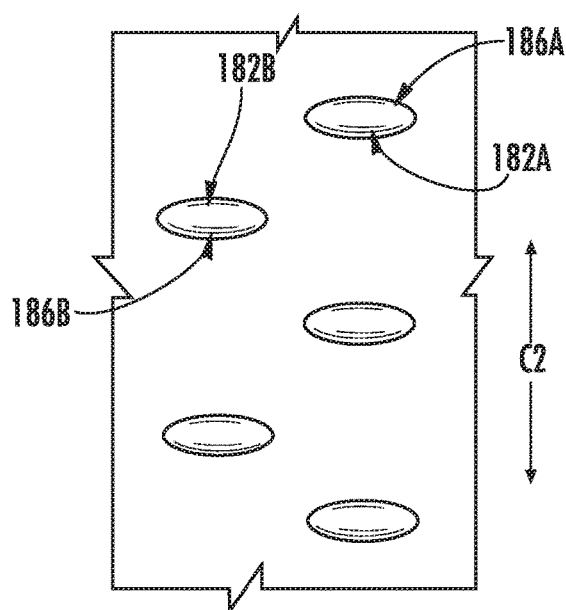
FIG. 11 is a plan view of an inside surface of a deflector in accordance with another exemplary embodiment of the present disclosure.

However, in other exemplary embodiments, the plurality of cooling holes 182 may be configured in still other exemplary manners. For example, referring briefly to FIG. 11, a plan view of a portion of a combustor surface 174 of a deflector 156 defining an opening 158 in accordance with another exemplary embodiment of the present disclosure is provided. As depicted, for the embodiment of FIG. 11, the first row of cooling holes 182A are staggered relative to the second row of cooling holes 182B along the circumferential direction C2.

Figure 12:
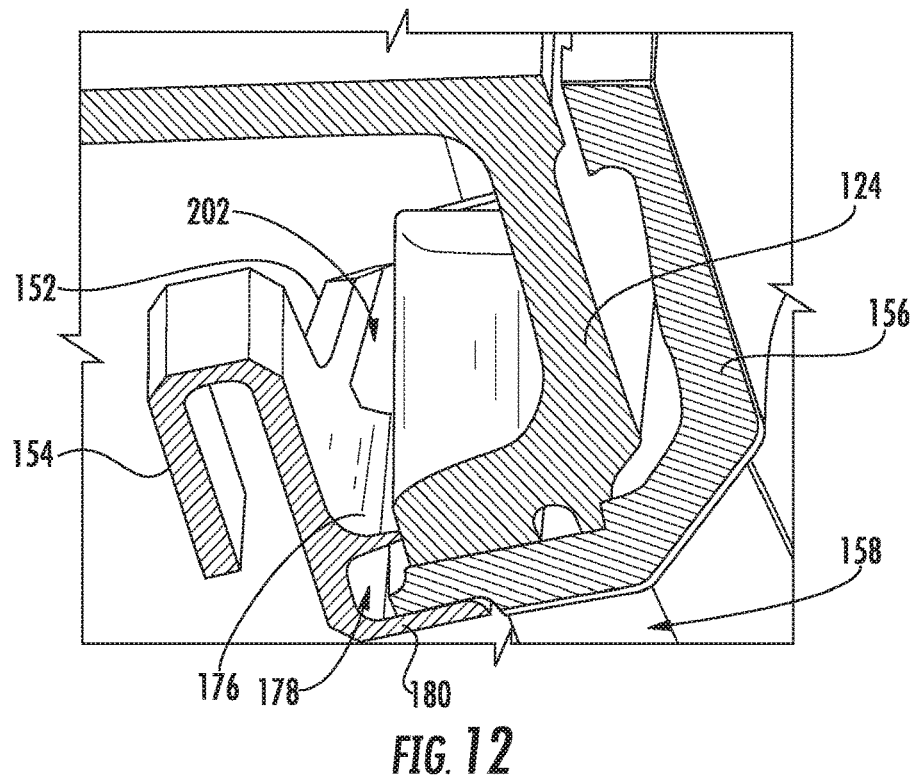
FIG. 12 is a perspective, cross-sectional view of a dome, a deflector, and a retainer in a combustor assembly in accordance with an exemplary embodiment of the present disclosure.
Figure 13:
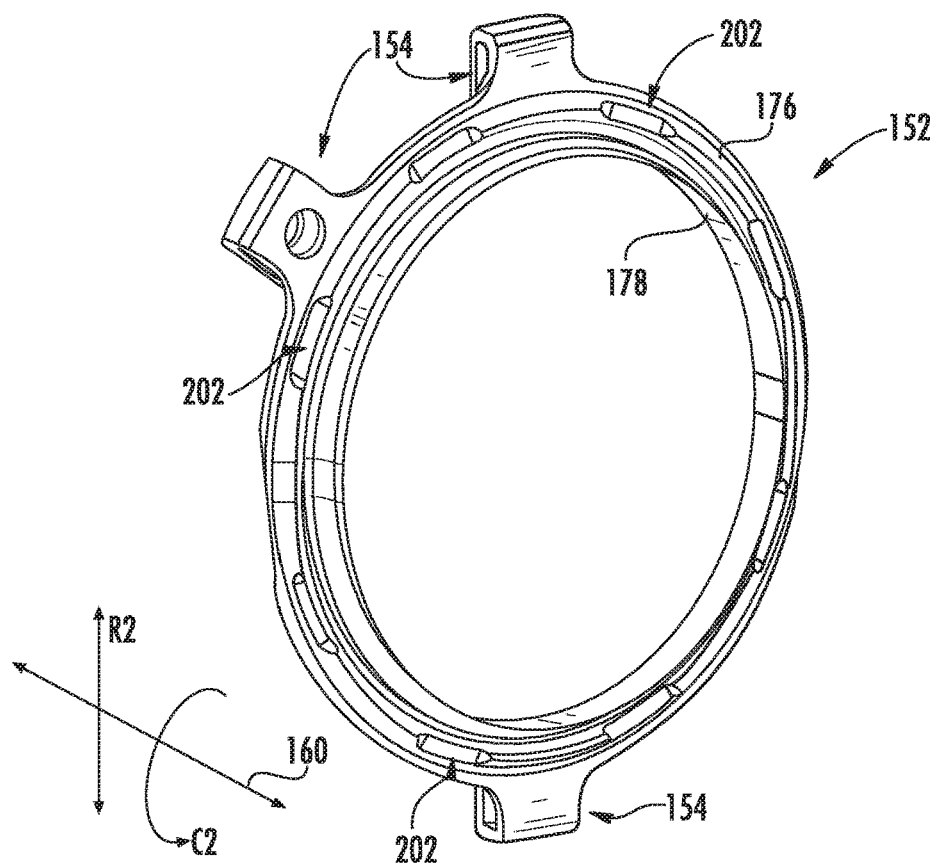
FIG. 13 is a perspective view of the exemplary retainer of FIG. 12.

Referring now to FIGS. 12 and 13, additional details of a retainer 152 in accordance with an exemplary embodiment of the present disclosure are provided. More specifically, FIG. 12 provides a perspective, cross-sectional view of a dome 120, a deflector 156, and a retainer 152 in accordance with an exemplary embodiment of the present disclosure, and FIG. 13 provides a perspective view of the exemplary retainer 152 of FIG. 12. In certain exemplary embodiments, the dome 120, deflector 156, and retainer 152 depicted in FIG. 12 may be configured in substantially the same manner as the exemplary dome 120, deflector 156, and retainer 152 described above with reference to, e.g., FIG. 5.

Accordingly, the exemplary retainer 152 depicted includes an outer member 176 contacting the dome 120, the deflector 156, or both, as well as an inner member 180 also contacting the dome 120, the deflector 156, or both. A retainer cavity 178 is defined at least in part by the outer member 176 and, for the embodiment depicted, at least in part by the inner member 180. Additionally, as is depicted schematically, a plurality of cooling holes 182 are provided extending between an inlet 184 exposed to the retainer cavity 178 and an outlet 186 defined in a combustor surface 174 of the dome 120.

As will be appreciated, cooling airflow is provided from the retainer cavity 178 and through the plurality of cooling holes 182 to a portion the combustor surface 174 of the deflector 156 defining the opening 158. In order to provide cooling airflow to the retainer cavity 178, the outer member 176 of the retainer 152 defines a slot 202 configured to provide cooling air to the retainer cavity 178. More specifically, as may be seen in the perspective view of FIG. 13, the outer member 176 of the retainer 152 further defines a plurality of slots 202 configured to provide cooling air to the retainer cavity 178. The air provided through the plurality of slots 202 defined by the outer member 176 of the retainer 152 to the retainer cavity 178 may be a compressor discharge air 126 from the first cavity 136 described above. Such a configuration may ensure a desired amount of cooling airflow is provided to the retainer cavity 178, such that a desired amount of cooling airflow may, in turn, be provided through the plurality of cooling holes 182.

Figure 14:
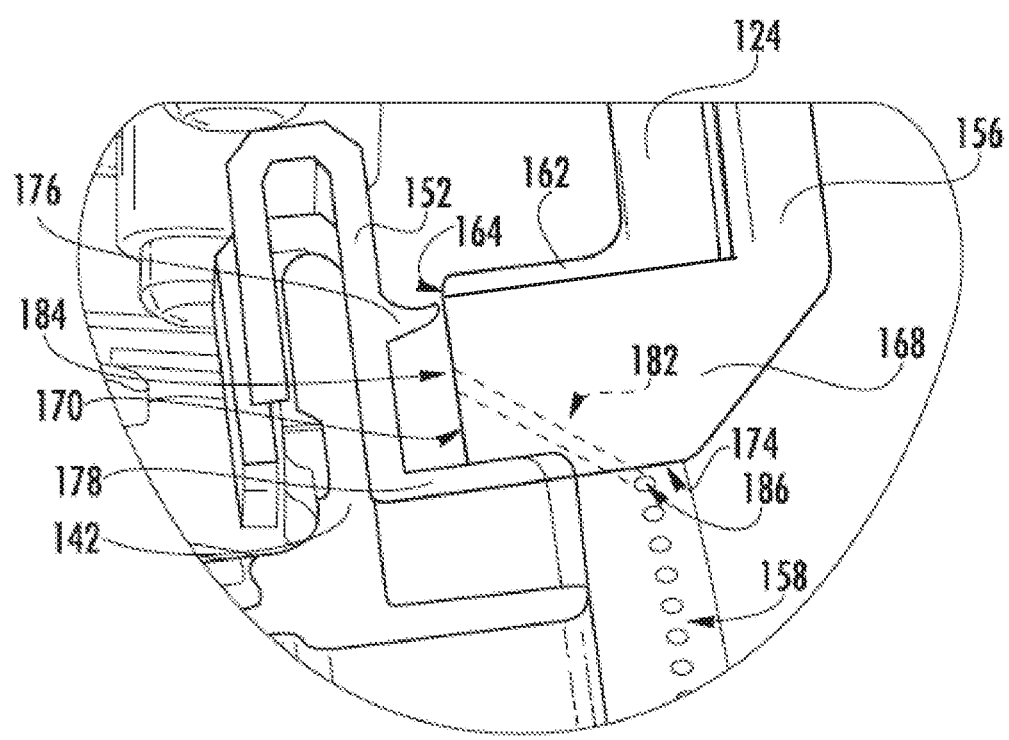
FIG. 14 is a close-up, cross-sectional view of a dome and a deflector of a combustor assembly in accordance with still another exemplary embodiment of the present disclosure.
Figure 15:
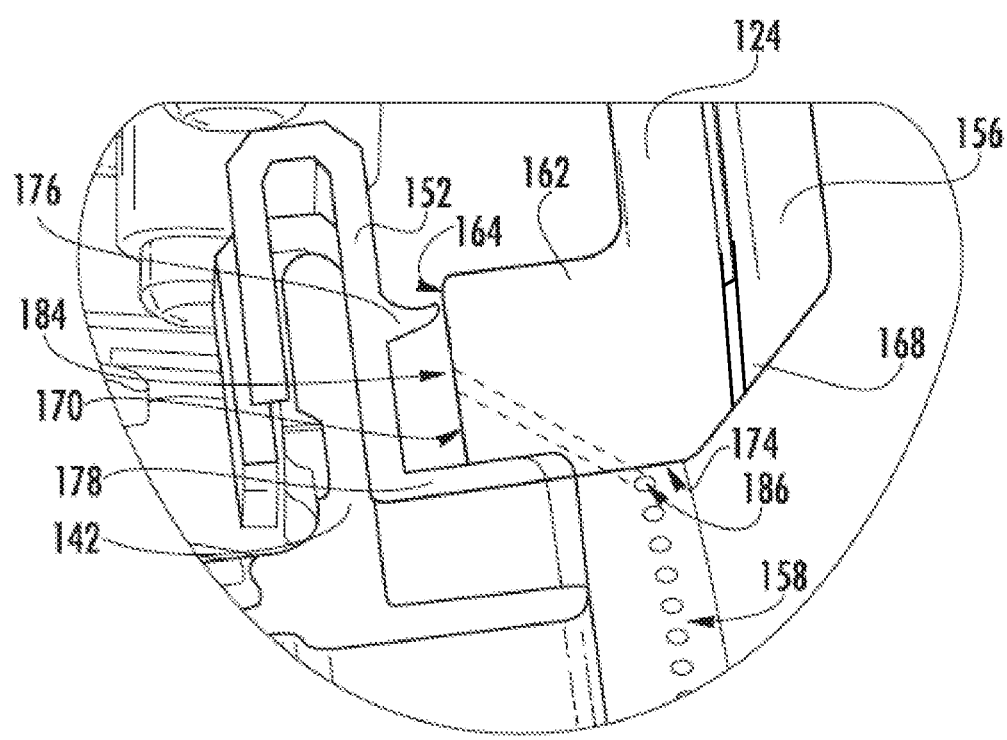
FIG. 15 is a close-up, cross-sectional view of a dome and a deflector of a combustor assembly in accordance with yet another exemplary embodiment of the present disclosure.

In addition, referring now to FIGS. 14 and 15, close-up views of a deflector 156, a dome 120, and a retainer 152 in accordance with two additional exemplary embodiments of the present disclosure are provided. As noted above, the exemplary retainers 152 depicted each include an outer member 176 contacting the dome 120, the deflector 156, or both, as well as an inner member 180 also contacting the dome 120, the deflector 156, or both. More specifically, referring particularly to FIG. 14, for the embodiment depicted, the outer member 176 contacts the deflector 156, and similarly, the inner member 180 also contacts the deflector 156. Further, referring particularly to FIG. 15, for the embodiment depicted, the outer member 176 contacts the dome 120, and similarly, the inner member 180 also contacts the dome 120.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustor assembly for a gas turbine engine, the combustor assembly comprising:
a dome comprising a perimeter flange, the perimeter flange having a forward end;
a deflector positioned adjacent to the dome and also comprising a perimeter flange defining a forward end, one or both of the dome and the deflector defining an opening, a component axis extending through the opening, and a radial direction relative to the component axis; and
a retainer comprising an outer member contacting the perimeter flange of the dome, the perimeter flange of the deflector or both, the outer member of the retainer defining at least in part a retainer cavity inward of the outer member along the radial direction;
wherein the dome, the deflector, or both define a plurality of cooling holes for providing a cooling airflow from the retainer cavity to the opening;
wherein the plurality of cooling holes each extend between an inlet defined in the forward end of the perimeter flange of the dome, in the forward end of the perimeter flange of the deflector, or in both, and an outlet at the opening;
wherein the perimeter flange of the dome contacts the perimeter flange of the deflector at a surface, and at least one of the plurality of cooling holes extends through the surface.

2. The combustor assembly of claim 1, wherein the deflector defines the opening, the component axis extending through the opening, and the radial direction relative to the component axis.

3. The combustor assembly of claim 2, wherein the deflector further defines a combustor surface at least partially defining a combustion chamber of the combustor assembly, wherein the combustor surface of the deflector defines the opening, and wherein the outlets of each of the plurality of cooling holes are defined in the combustor surface of the deflector.

4. The combustor assembly of claim 3, wherein the opening defined by the combustor surface of the deflector is a substantially cylindrical opening.

5. The combustor assembly of claim 4, further comprising:
a fuel nozzle extending at least partially into the opening, wherein the deflector comprises a first bend at an aft end of the opening, wherein the deflector begins to extend outwardly from the component axis at the first bend, and wherein the outlets of each of the plurality of cooling holes are defined in the combustor surface of the deflector at a location forward of the first bend.

6. The combustor assembly of claim 1, wherein the plurality of cooling holes are defined in part by the dome and in part the deflector.

7. The combustor assembly of claim 1, wherein the retainer includes one or more attachment members for mounting a mixer of the combustor assembly.

8. The combustor assembly of claim 1, wherein the outer member of the retainer defines a slot configured to provide cooling air to the cavity defined in part by the outer member of the retainer.

9. The combustor assembly of claim 1, wherein the outer member of the retainer defines a plurality of slots configured to provide cooling air to the cavity defined in part by the outer member of the retainer.

10. The combustor assembly of claim 1, wherein the plurality of cooling holes includes at least fifty cooling holes.

11. The combustor assembly of claim 1, wherein the component axis and radial direction together define a reference plane, and wherein one or more of the plurality of cooling holes intersecting the reference plane defines an angle with the reference plane of at least twenty degrees.

12. The combustor assembly of claim 1, wherein each of the plurality of cooling holes slope inwardly along the radial direction towards the component axis such that each of the plurality of cooling holes defines an angle with the component axis of at least ten degrees.

13. The combustor assembly of claim 1, further comprising:
a fuel nozzle extending at least partially into the opening, wherein the fuel nozzle defines an axis that aligns with the component axis.

14. The combustor assembly of claim 1, wherein the outer member of the retainer contacts the forward end of the perimeter flange of the dome, the forward end of the perimeter flange of the deflector or both.

15. The combustor assembly of claim 1, wherein each cooling hole extends continuously from its respective inlet to its respective outlet.

16. A combustor assembly for a gas turbine engine, the combustor assembly comprising:
a dome comprising a perimeter flange, the perimeter flange having a forward end;
a deflector attached to the dome and defining an opening and also comprising a perimeter flange defining a forward end, a component axis extending through the opening, and a radial direction relative to the component axis; and
a retainer comprising an inner member and an outer member along the radial direction of the deflector, the inner member contacting the dome, the deflector or both, and the outer member contacting the perimeter flange of the dome, the perimeter flange of the deflector, or both, the retainer defining a retainer cavity between the inner member and outer member;
wherein the dome, the deflector, or both define a plurality of cooling holes for providing a cooling airflow from the retainer cavity to the opening;
wherein the plurality of cooling holes each extend between an inlet defined in the forward end of the perimeter flange of the dome, in the forward end of the perimeter flange of the deflector, or in both, and an outlet at the opening;
wherein the perimeter flange of the dome contacts the perimeter flange of the deflector at a surface, and at least one of the plurality of cooling holes extends through the surface.

17. The combustor assembly of claim 15, wherein the deflector further defines a combustor surface at least partially defining a combustion chamber of the combustor assembly, wherein the combustor surface of the deflector defines the opening, and wherein the outlets of each of the plurality of cooling holes are defined in the combustor surface of the deflector.

18. The combustor assembly of claim 17, wherein the deflector comprises a first bend at an aft end of the opening, wherein the deflector begins to extend outwardly from the component axis at the first bend, and wherein the outlets of each of the plurality of cooling holes are defined in the combustor surface of the deflector at a location forward of the first bend.

19. The combustor assembly of claim 16, wherein the plurality of cooling holes are defined in part by the dome and in part the deflector.

20. A gas turbine engine defining an axial direction, the gas turbine engine comprising:
- a combustion section comprising a combustor assembly, the combustor assembly comprising:
- a dome comprising a perimeter flange, the perimeter flange having a forward end;
- a deflector positioned adjacent to the dome and also comprising a perimeter flange defining a forward end, one or both of the dome and the deflector defining an opening, a component axis extending through the opening, and a radial direction relative to the component axis; and
- a retainer comprising an outer member contacting the perimeter flange of the dome, the perimeter flange of the deflector or both, the outer member of the retainer defining at least in part a retainer cavity inward of the outer member along the radial direction;
- wherein the dome, the deflector, or both define a plurality of cooling holes for providing a cooling airflow from the retainer cavity to the opening;
- wherein the plurality of cooling holes each extend between an inlet defined in the forward end of the perimeter flange of the dome, in the forward end of the perimeter flange of the deflector, or in both, and an outlet at the opening;
- wherein the perimeter flange of the dome contacts the perimeter flange of the deflector at a surface, and at least one of the plurality of cooling holes extends through the surface.

* * * * *